United States Patent
Wang et al.

(10) Patent No.: US 12,528,938 B2
(45) Date of Patent: Jan. 20, 2026

(54) HETEROPHASIC POLYPROPYLENE COMPOSITIONS COMPRISING A RECYCLED MATERIAL AS MODIFIER WITH AN IMPROVED BALANCE OF MECHANICAL PROPERTIES

(71) Applicant: Borealis AG, Vienna (AT)

(72) Inventors: Jingbo Wang, Linz (AT); Markus Gahleitner, Linz (AT); Klaus Bernreitner, Linz (AT); Hermann Braun, Linz (AT)

(73) Assignee: Borealis AG, Vienna (AT)

( * ) Notice: Subject to any disclaimer, the term of this patent is extended or adjusted under 35 U.S.C. 154(b) by 756 days.

(21) Appl. No.: 17/791,938

(22) PCT Filed: Jan. 15, 2021

(86) PCT No.: PCT/EP2021/050771
§ 371 (c)(1),
(2) Date: Jul. 11, 2022

(87) PCT Pub. No.: WO2021/144404
PCT Pub. Date: Jul. 22, 2021

(65) Prior Publication Data
US 2023/0096321 A1    Mar. 30, 2023

(30) Foreign Application Priority Data

Jan. 15, 2020 (EP) .................... 20151948

(51) Int. Cl.
*C08L 23/12* (2006.01)
*C08L 23/0807* (2025.01)

(52) U.S. Cl.
CPC ........... *C08L 23/12* (2013.01); *C08L 23/0815* (2013.01); *C08L 2205/035* (2013.01); *C08L 2207/02* (2013.01)

(58) Field of Classification Search
CPC ............. C08L 23/12; C08L 23/0815; C08L 2205/035; C08L 2207/02; C08F 2420/07; C08F 4/65908; C08F 4/65912; C08F 4/65916; C08F 210/06; Y02W 30/62
See application file for complete search history.

(56) References Cited

FOREIGN PATENT DOCUMENTS

| EP | 0887379 | A1 | 12/1998 | |
|---|---|---|---|---|
| EP | 1963067 | B1 * | 3/2010 | ......... B29B 17/0042 |
| EP | 3165473 | A1 | 5/2017 | |
| EP | 19177307.6 | | 5/2019 | |
| EP | 3715410 | A1 | 9/2020 | |
| EP | 3976667 | A1 | 4/2022 | |
| WO | 92012182 | A1 | 7/1992 | |
| WO | 2007071494 | A1 | 6/2007 | |
| WO | 2015169690 | A1 | 11/2015 | |
| WO | 2016066446 | A1 | 5/2016 | |
| WO | WO-2018206353 | A1 * | 11/2018 | .............. C08L 23/10 |
| WO | WO-2019086359 | A1 * | 5/2019 | .............. C08L 23/12 |
| WO | 2020239598 | A1 | 12/2020 | |

OTHER PUBLICATIONS

Office Action for European Patent Application No. 21701074.3 dated Dec. 21, 2023, 5 pages.
Busico, et al., "Microstructure of polypropylene," Progress in Polymer Science, vol. 26, 2001, pp. 443-533.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Zhou, Z., Kuemmerle, R., Qiu, X., Redwine, D., Cong, R., Taha, A., Baugh, D. Winniford, B., J. Mag. Reson. 187 (2007) 225.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.
Wang, et al., "Structural Analysis of Ethylene/Propylene Copolymers Synthesized with a Constrained Geometry Catalyst," Macromolecules, 2000, vol. 33, pp. 1157-1162.
Resconi, et al., "Selectivity in Propene Polymerization with Metallocene Catalysts," Chem. Rev., 2000, vol. 100, pp. 1253-1345.
International Search Report and Written Opinion for PCT/EP2021/050771 mailed Apr. 29, 2021, 12 pages.

\* cited by examiner

*Primary Examiner* — Kumar R Bhushan
(74) *Attorney, Agent, or Firm* — Lowenstein Sandler LLP

(57) ABSTRACT

A polypropylene composition (C) obtainable by blending: a) 50.0 to 95.0 wt.-% of a heterophasic propylene copolymer (HECO) defined by its crystalline fraction content (78.0 to 92.0 wt.-%), soluble fraction content (8.0 to 22.0 wt.-%), C2 content of said soluble fraction (15.0 to 30.0 wt.-%) and intrinsic viscosity of the soluble fraction (1.80 to 3.50 dl/g), b) 5.0 to 50.0 wt.-% of a blend (A) comprising polypropylene and polyethylene in a weight ratio of from 9:1 to 13:7, wherein blend (A) is a recycled material recovered from a waste plastic material derived from post-consumer and/or post-industrial waste; wherein the polypropylene composition (C) has a melt flow rate (MFR2) of 20.0 to 70.0 g/10 min.

15 Claims, 1 Drawing Sheet

(a)
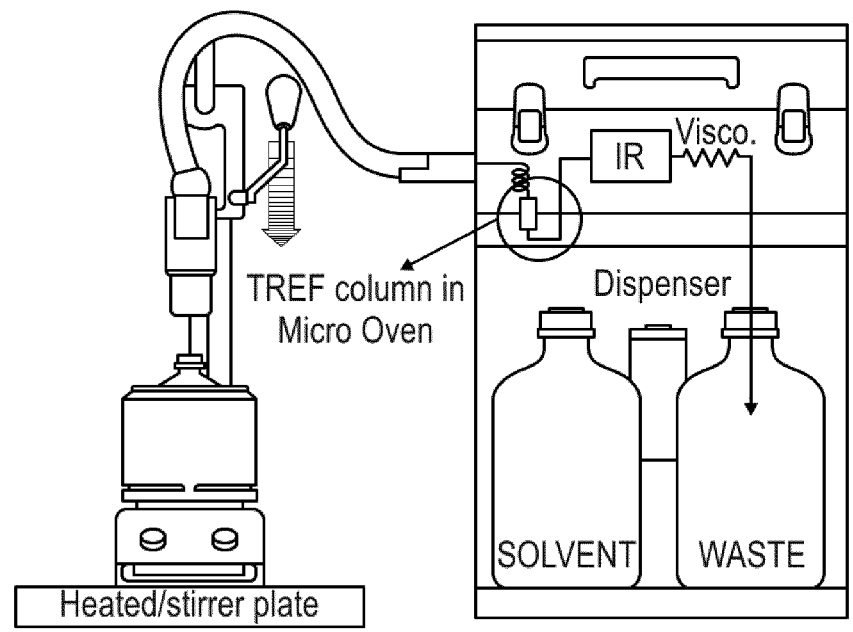
(b)
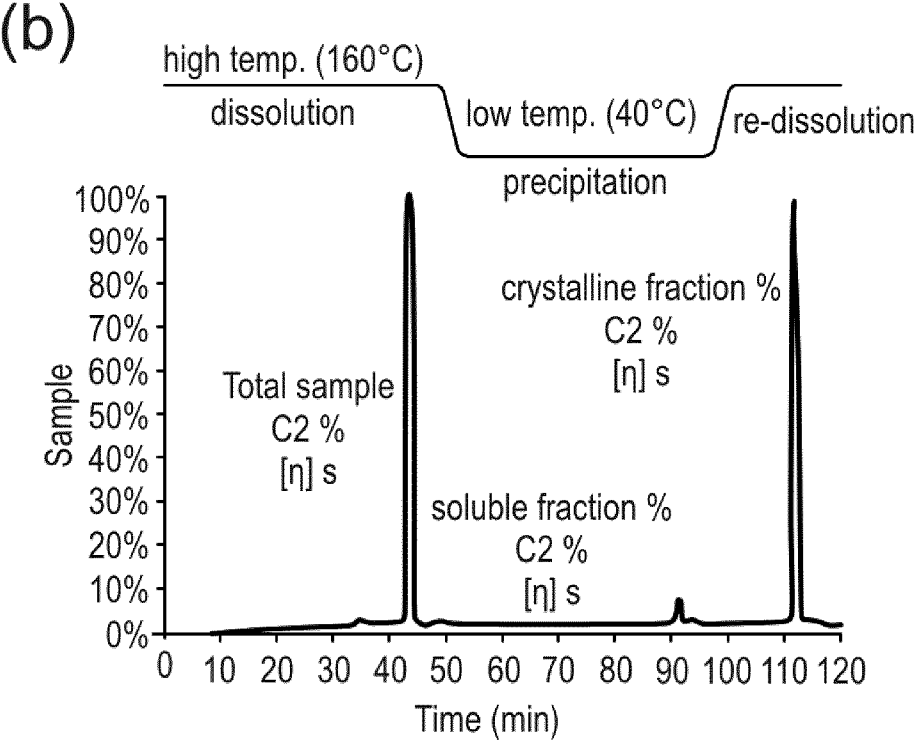
(a) Schematic diagram of the CRYSTEX QC instrument (b) Elution of the EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene

HETEROPHASIC POLYPROPYLENE COMPOSITIONS COMPRISING A RECYCLED MATERIAL AS MODIFIER WITH AN IMPROVED BALANCE OF MECHANICAL PROPERTIES

CROSS-REFERENCE TO RELATED APPLICATION(S)

The present application is a national stage entry under 35 U.S.C. § 371 of International Application No. PCT/EP2021/050771, filed on Jan. 15, 2021, which claims priority to European Patent Application No. 20151948.5, filed on Jan. 15, 2020. The contents of these applications are hereby incorporated by reference in their entirety.

FIELD OF THE INVENTION

The present invention relates to a polypropylene composition obtainable by blending a virgin heterophasic propylene copolymer with a blend of polyethylene and polypropylene being a recycled material recovered from a waste plastic material derived from post-consumer and/or post-industrial waste, and an article comprising said polypropylene composition.

BACKGROUND TO THE INVENTION

Polyolefins, in particular polyethylene and polypropylene are increasingly consumed in large amounts in a wide range of applications, including packaging for food and other goods, fibres, automotive components, and a great variety of manufactured articles.

Polypropylene based materials offer significant potential for mechanical recycling, as these materials are extensively used in packaging. Taking into account the huge amount of waste collected compared to the amount of waste recycled back into the stream, there is still a great potential for intelligent reuse of plastic waste streams and for mechanical recycling of plastic wastes.

Development of polyolefins and polyolefin blends is often focussed on the continuous goal of improving the balance of mechanical properties, and also the more effective handling of waste streams, for both economical and also environmental reasons. It is usually understood that the use of recycled materials in polymer blends tends to lead to a degradation of mechanical properties, since the mechanical properties of virgin polymers can be easily modified by the polymerization conditions, whereas controlling the properties of a recycled material is intrinsically more difficult, resulting in poorer performance of these compositions. Given this understanding in the field, a polyolefin composition that is able to make use of recycled materials as a modifier for a virgin polyolefin, said composition having improved mechanical properties over the component virgin polyolefin, would be of great importance in the field of repurposing of waste polyolefin materials.

Such combinations of recycled material and virgin material have not been widely reported.

Rather, modifications of recycled polyolefin compositions with a minor amount of modifiers can be found in the prior art.

For example, WO 2015/169690 A1 relates to polypropylene-polyethylene blends comprising A) 75 to 90 wt.-% of a blend of A-1) polypropylene and A-2) polyethylene and B) 10 to 25 wt.-% of a compatibilizer being a heterophasic polyolefin composition comprising B-1) a polypropylene with an MFR2 between 1.0 and 300 g/10 min (according to ISO 1133 at 230° C. at a load of 2.16 kg) and B-2) a copolymer of ethylene and propylene or C4 to C10 alpha olefin with a Tg (measured with dynamic-mechanical thermal analysis, DMTA, according to ISO 6721-7) of below −25° C. and an intrinsic viscosity (measured in decalin according to DIN ISO 1628/1 at 135° C.) of at least 3.0 dl/g, whereby the blend has simultaneously increased Charpy Notched Impact Strength (according to ISO 179-leA, measured at 23° C.), Flexural Modulus (according to ISO 178) as well as heat deflection resistance (determined with DMTA according to ISO 6721-7). Although not limited as such, the blend A) may be a recycled material, such as Krublend or DIPOLEN S.

Likewise, EP 3 165 473 A1 refers to a composition of polypropylene and polyethylene, which contains a specific compatibilizer and flow enhancer. The compatibilizer and flow enhancer is a heterophasic polyolefin composition comprising 55 to 90 wt.-% of a matrix being a polypropylene and 45 to 10 wt.-% of an elastomer being a copolymer of ethylene and propylene or C4 to C10 alpha olefin with a glass transition temperature Tg measured according to ISO 6721-7 of below −25° C. and an intrinsic viscosity measured according to DIN ISO 1628/1 at 135° C. of at least 3.0 dl/g.

In both cases, improvements are only achieved with respect to the composition of polypropylene and polyethylene (i.e. the recycled material), not in comparison to the applied compatibilizer or modifier.

It is further well known in the art that increasing the melt flow rate of polypropylene compositions is often detrimental to the impact strength; consequently, in addition to having an improved balance stiffness and impact properties, it is a further object of the present invention to provide a composition having a good balance of high melt flow rate and high impact strength.

Additionally, due to contamination during their previous lifecycle, recycled materials are known to retain certain odors, making them unsuitable for use in applications where low odor is beneficial (for example automotive interiors). It is a further object of the present invention to achieve compositions containing recycled material whilst keeping levels of odorants (given by the volatile organic compound (VOC) content and the semi-volatile organic compound (FOG) content). Whilst odor issues are particularly associated with recycled polyolefins, the presence of short-chain oligomers as byproducts during the polymerisation process can lead to significant VOC/FOG content for virgin polyolefins as well, and thus the selection of each component is vital when VOC/FOG considerations are important.

Furthermore, in the interests of economy, the present application is directed to simple, economic blends that achieve the goals of the invention without resorting to the introduction of fillers or other polymeric modifiers.

SUMMARY OF THE INVENTION

The present invention is based upon the finding that a specific recycled material, containing polypropylene and polyethylene, can be used to improve the mechanical properties of a virgin heterophasic propylene copolymer (HECO). The stiffness of blends of said recycled material and virgin HECO is equal to or greater than that of the virgin HECO and the impact strength is markedly improved. It is noteworthy that the content of volatile and semi-volatile compounds (VOC and FOG values) is also favourably low, a property particularly useful when manufacturing automotive articles.

The present invention is therefore directed to a polypropylene composition (C) obtainable by blending:
a) 50.0 to 95.0 wt.-%, based on the total weight of the composition, of a heterophasic propylene copolymer (HECO), comprising
  i) a crystalline matrix (M) being a propylene homo- or copolymer, preferably a homopolymer;
  ii) an amorphous propylene-ethylene elastomer (E);
  wherein the heterophasic propylene copolymer (HECO) has a crystalline fraction (CF) content determined according to CRYSTEX QC analysis in the range from 78.0 to 92.0 wt.-%, and a soluble fraction (SF) content determined according to CRYSTEX QC analysis in the range from 8.0 to 22.0 wt.-%, said soluble fraction (SF) having an ethylene content (C2(SF)), as determined by quantitative Fourier-transform infrared (FT-IR) spectroscopy calibrated by $^{13}$C-NMR spectroscopy, in the range from 15.0 to 30.0 wt.-% and an intrinsic viscosity (iV(SF)) in the range from 1.80 to 3.50 dl/g;
b) 5.0 to 50.0 wt.-%, based on the total weight of the composition, of a blend (A) comprising
  A-1) polypropylene
  A-2) polyethylene
  wherein the weight ratio of polypropylene (A-1) and polyethylene (A-2) is from 9:1 to 13:7, and
  wherein blend (A) is a recycled material, which is recovered from a waste plastic material derived from post-consumer and/or post-industrial waste;
  wherein the polypropylene composition (C) has a melt flow rate (MFR2) measured according to ISO 1133 at 230° C. and 2.16 kg in the range from 20.0 to 70.0 g/10 min, and the sum of the content of the heterophasic propylene copolymer (HECO) and the content of blend (A) is at least 90 wt.-%, based on the total weight of the composition.

In another aspect, the present invention is directed to an article comprising more than 75 wt.-%, preferably more than 90 wt.-%, of the polypropylene composition according to any of the preceding claims, preferably a molded article, more preferably an injection molded article or a foam injection molded article.

In a further aspect, the present invention is directed to a use of a modifier being a blend (A), which comprises:
  A-1) polypropylene
  A-2) polyethylene
wherein the weight ratio of polypropylene (A-1) and polyethylene (A-2) is from 9:1 to 13:7, and
wherein blend (A) is a recycled material, which is recovered from a waste plastic material derived from post-consumer and/or post-industrial waste,
for modifying a heterophasic propylene copolymer (HECO) comprising:
  i) a crystalline matrix (M) being a propylene homo- or copolymer, preferably a homopolymer;
  ii) an amorphous propylene-ethylene elastomer (E);
wherein the heterophasic propylene copolymer (HECO) has a crystalline fraction (CF) content determined according to CRYSTEX QC analysis in the range from 78.0 to 92.0 wt.-%, and a soluble fraction (SF) content determined according to CRYSTEX QC analysis in the range from 8.0 to 22.0 wt.-%, said soluble fraction (SF) having an ethylene content (C2(SF)), as determined by quantitative FT-IR spectroscopy calibrated by $^{13}$C-NMR spectroscopy, in the range from 15.0 to 30.0 wt.-% and an intrinsic viscosity (iV(SF)) in the range from 1.80 to 3.50 dl/g;
thereby obtaining an upgraded polypropylene composition, comprising at least a combined 90 wt.-% of the modifier and heterophasic propylene copolymer (HECO), having: an improvement in the Charpy Notched Impact Strength (NIS), measured according to ISO 179-leA at 23° C., of at least 15% relative to the raw heterophasic propylene copolymer (HECO), and
an improvement in the tensile modulus, measured according to ISO 527-2, of at least 8% relative to the raw heterophasic propylene copolymer (HECO).

Definitions

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below.

Unless clearly indicated otherwise, use of the terms "a," "an," and the like refers to one or more.

A heterophasic polypropylene is a propylene-based copolymer with a crystalline matrix phase, which can be a propylene homopolymer or a random copolymer of propylene and at least one alpha-olefin comonomer, and an elastomeric phase dispersed therein. In case of a random heterophasic propylene copolymer, said crystalline matrix phase is a random copolymer of propylene and at least one alpha-olefin comonomer. The polymers according to the present invention have such morphology.

The elastomeric phase can be a propylene copolymer with a high amount of comonomer that is not randomly distributed in the polymer chain but is distributed in a comonomer-rich block structure and a propylene-rich block structure. A heterophasic polypropylene usually differentiates from a one-phasic propylene copolymer in that it shows two distinct glass transition temperatures Tg which are attributed to the matrix phase and the elastomeric phase.

A propylene homopolymer is a polymer that essentially consists of propylene monomer units. Due to impurities especially during commercial polymerization processes a propylene homopolymer can comprise up to 0.1 mol % comonomer units, preferably up to 0.05 mol % comonomer units and most preferably up to 0.01 mol % comonomer units. A propylene random copolymer is a copolymer of propylene monomer units and comonomer units, preferably selected from ethylene and C4-C12 alpha-olefins, in which the comonomer units are distributed randomly over the polymeric chain. The propylene random copolymer can comprise comonomer units from one or more comonomers different in their amounts of carbon atoms. In the following amounts are given in % by weight (wt.-%) unless it is stated otherwise.

For the purposes of the present description and of the subsequent claims, the term "recycled waste" and is used to indicate a material recovered from both post-consumer waste and post-industrial waste, as opposed to virgin polymers. Post-consumer waste refers to objects having completed at least a first use cycle (or life cycle), i.e. having already served their first purpose; while post-industrial waste refers to manufacturing scrap, which does not normally reach a consumer.

The term "virgin" denotes the newly produced materials and/or objects prior to their first use, which have not already been recycled.

Many different kinds of polyethylene or polypropylene can be present in "recycled waste". Blend (A) according to the present invention includes at least a polypropylene, polyethylene, limonene and fatty acids.

Blend (A) is further characterized by a content of polypropylene. The content of polypropylene may easily be determined by FT-IR spectroscopy, whereby FT-IR spectroscopy needs to be calibrated by using C-NMR spectroscopy as described in the experimental section.

Blend (A) is further characterized by a content of polyethylene and ethylene containing copolymers. Polyethylene denotes any of the conventional polyethylenes such as LDPE, LLDPE, MDPE, and HDPE.

Ethylene containing copolymers are extremely widespread and may include for example ethylene propylene copolymers such as ethylene propylene rubber, plastomers such as $C_2C_8$ rubbers, and countless other polymers including ethylene-derived units.

The term "recycled material" such as used herein denotes materials reprocessed from "recycled waste".

A polymer blend denotes a mixture of two or more polymeric components. In general, the blend can be prepared by mixing the two or more polymeric components. Suitable mixing procedures known in the art are post-polymerization blending procedures.

Post-polymerization blending can be dry blending of polymeric components such as polymer powders and/or compounded polymer pellets or melt blending by melt mixing the polymeric components.

The term "volatile organic compound content" or "VOC content" refers to the toluene equivalent content in a sample emission of material determined according to the Verband der Automobilindustrie recommendation VDA 278 October 2011. Volatile organic compound content is a measure of emissions from plastic materials such as low-density plastomers, which are caused by low-molecular components in the polymer material, generally alkanes with carbon chain lengths of up to C20. These low-molecular components can be residual monomers, oligomers, additives, plasticizers and/or degradation products.

The term "semi-volatile organic condensables content" (FOG content) refers to the n-hexadecane equivalent content in a sample emission of material determined according to the Verband der Automobilindustrie recommendation VDA 278 October 2011. Semi-volatile organic compound content is a measure of emissions from plastic materials, which are caused by medium molecular weight components, such as oligomers, which have a boiling point in the boiling range of the $C_{16}$-$C_{32}$ alkanes.

If not indicated otherwise "%" refers to weight-%.

DETAILED DESCRIPTION OF THE INVENTION

Heterophasic Propylene Copolymer (HECO)

The polypropylene composition (C) according to the present invention comprises 50.0 to 95.0 wt.-%, based on the total weight of the composition, of the heterophasic propylene copolymer (HECO), preferably 51.0 to 90.0 wt.-%, most preferably 52.0 to 85.0 wt.-%.

The heterophasic propylene copolymer (HECO) according to the present invention comprises:
  i) a crystalline matrix (M);
  ii) an amorphous propylene-ethylene elastomer (E);

The crystalline matrix (M) is a propylene homo- or copolymer, preferably a homopolymer.

The crystalline matrix (M) preferably has a melt flow rate (MFR2) measured according to ISO 1133 at 230° C. and 2.16 kg in the range from 80 to 180 g/10 min, more preferably in the range from 90 to 140 g/10 min, most preferably in the range from 95 to 140 g/10 min.

The crystalline matrix component (M) preferably has an isotactic pentad concentration [mmmm] as determined by $^{13}$C-NMR spectroscopy of more than 97.0%, and a content of 2,1-regiodefects in the range from 0.1 to 0.6 mol %. Such ranges are typical for polypropylenes polymerized using metallocene catalysts.

Preferably the heterophasic propylene copolymer (HECO) has been polymerized in the presence of a single site catalyst, more preferably a metallocene catalyst.

In a heterophasic propylene copolymer the matrix and elastomeric phases cannot be separated and measured, since the elastomeric phase is dispersed within the crystalline matrix. In order to characterize the matrix and elastomeric phases of a heterophasic propylene copolymer several methods are known. One method is the extraction with xylene of a fraction that contains for the most part the elastomeric phase, thus separating a xylene cold soluble (XCS) fraction from a xylene cold insoluble (XCI) fraction. The XCS fraction contains for the most part the elastomeric phase and only a small part of the matrix phase, whereas the XCI fraction contains for the most part the matrix phase and only a small part of the elastomeric phase.

As an alternative method the separation of a crystalline fraction and a soluble fraction with the CRYSTEX QC method using trichlorobenzene (TCB) as a solvent. This method is described below in the determination methods section. The crystalline fraction (CF) contains for the most part the matrix phase and only a small part of the elastomeric phase and the soluble fraction (SF) contains for the most part the elastomeric phase and only a small part of the matrix phase. In some cases, this method results in more useful data, since the crystalline fraction (CF) and the soluble fraction (SF) more accurately correspond to the matrix and elastomeric phases respectively. Due to the differences in the separation methods of xylene extraction and CRYSTEX QC method the properties of XCS/XCI fractions on the one hand and crystalline/soluble (CF/SF) fractions on the other hand are not exactly the same, meaning that the amounts of matrix phase and elastomeric phase can differ as well as the properties.

The heterophasic propylene copolymer preferably has a content of xylene cold solubles (XCS), determined at 25° C. according to ISO 16152; 5$^{th}$ edition; 2005-07-01, of from 9.0 to 20.0 wt.-%, more preferably from 10.0 to 19.0 wt.-%, most preferably from 11.0 to 18.0 wt.-%.

Said xylene cold soluble fraction preferably has an ethylene (C2) content (C2(XCS)), as determined by quantitative $^{13}$C-NMR spectroscopy, of from 15.0 to 30.0 wt.-%, more preferably from 17.0 to 25.0 wt.-%, most preferably from 18.0 to 22 wt.-%.

Said xylene cold soluble fraction preferably has an intrinsic viscosity (iV(XCS)) of from 1.8 to 3.5 dl/g, more preferably from 2.0 to 3.2 dl/g, most preferably from 2.2 to 3.0 dl/g.

The heterophasic propylene copolymer (HECO) of the present invention has a content of crystalline fraction (CF), determined according to CRYSTEX analysis, within the range from 78.0 to 92.0 wt.-%, preferably 81.0 to 90.0 wt.-%, based on the total weight of the heterophasic propylene copolymer.

The heterophasic propylene copolymer (HECO) of the present invention has a content of soluble fraction (SF), determined according to CRYSTEX analysis, within the range from 8.0 to 22.0 wt.-%, preferably 10.0 to 19.0 wt.-%, based on the total weight of the heterophasic propylene copolymer.

The crystalline fraction (CF) of the heterophasic propylene copolymer (HECO) preferably has an ethylene content (C2(CF)), as determined by quantitative FT-IR spectroscopy calibrated by $^{13}$C-NMR spectroscopy, in the range from 0.5 to 3.0 wt.-%, more preferably in the range from 0.7 to 2.0 wt.-%, most preferably in the range from 1.0 to 1.5 wt.-%.

The soluble fraction (SF) of the heterophasic propylene copolymer (HECO) has an ethylene content (C2(SF)), as determined by quantitative FT-IR spectroscopy calibrated by $^{13}$C-NMR spectroscopy, in the range from 15.0 to 30.0 wt.-%, preferably in the range from 16.0 to 25.0 wt.-%, more preferably in the range from 17.0 to 20.0 wt.-%.

The soluble fraction (SF) of the heterophasic propylene copolymer (HECO) has an intrinsic viscosity (iV(SF)) in the range from 1.8 to 3.5 dl/g, preferably in the range from 2.0 to 3.2 dl/g, more preferably in the range from 2.1 to 3.1 dl/g.

The heterophasic propylene copolymer (HECO) preferably has a total ethylene (C2) content, as determined by quantitative FT-IR spectroscopy calibrated by $^{13}$C-NMR spectroscopy, of from 1.0 to 10.0 wt.-%, more preferably from 1.5 to 7.0 wt.-%, most preferably from 2.0 to 5.0 wt.-%.

The heterophasic propylene copolymer (HECO) preferably has a melt flow rate (MFR2) measured according to ISO 1133 at 230° C. and 2.16 kg in the range from 30 to 120 g/10 min, more preferably from 35 to 110 g/10 min, most preferably from 38 to 100 g/10 min.

The heterophasic propylene copolymer (HECO) preferably has a melting temperature ($T_m$) measured by differential scanning calorimetry (DSC) in the range from 150 to 162° C., more preferably in the range from 151 to 159° C., most preferably in the range from 152 to 156° C.

The heterophasic propylene copolymer (HECO) preferably has a crystallization temperature ($T_a$) measured by differential scanning calorimetry (DSC) in the range from 105 to 120° C., more preferably in the range from 109 to 118° C., most preferably in the range from 112 to 116° C.

Process for the Polymerization of the Heterophasic Propylene Copolymer (HECO)

The heterophasic propylene copolymer of the present invention may be polymerised by sequential polymerisation in the presence of a metallocene catalyst system, wherein a) a first polypropylene fraction being a propylene homopolymer or a propylene ethylene random copolymer having a comonomer content of 0.0 to 1.0 wt.-% is prepared in a bulk phase reactor in a first polymerisation stage b) optionally transferring said first polypropylene fraction into second polymerisation stage in which a second polypropylene fraction being a propylene homopolymer or a propylene-ethylene random copolymer having a comonomer content of 0.0 to 1.0 wt.-% is prepared in a gas phase reactor (GPR1), c) transferring the first polypropylene fraction (a) or the mixture comprising said first and second polypropylene fraction together (b) to a second (optionally third) polymerisation stage in which the amorphous propylene ethylene elastomer having a comonomer content (C2 of XCS) of 15.0 to 30.0 wt.-%, like 16.5 to 28.0 wt.-%, or 17.5 to 26.0 wt.-%. is prepared in a gas phase reactor, d) the mixture of said two, optionally three polymers, optionally being subjected to a deactivation and purification step followed by compounding and pelletisation.

In a preferred embodiment, the polymerisation process is carried out in the presence of a metallocene catalyst system as laid out herein.

The heterophasic polypropylene composition of the present invention is typically and preferably made in a multistep process well known in the art. A preferred multistage process is a loop-gas phase-process, such as developed by Borealis A/S, Denmark (known as BORSTAR® technology) described e.g. in patent literature, such as in EP-A-0887379 or in WO 92/12182.

The invention preferably relates to the copolymerisation of propylene, ethylene and optionally further comonomers as defined above and below, in an at least two, optionally three step process so as to form the heterophasic polypropylene composition. Preferably, propylene and ethylene are the only monomers used.

Ideally, the process of the invention employs two, preferably three main reactors, a first reactor operating in bulk, a first gas phase reactor and optionally a second gas phase reactor.

The process may also utilize a prepolymerisation step, taking place in a separate reactor before the three main reactors.

The crystalline matrix may be present in the range of 78 to 95 wt.-%, preferably in the range of 80 to 93 wt.-%, more preferably in the range of 81 to 92 wt.-%, based on the total weight of the heterophasic polypropylene composition.

The elastomeric phase comprised in the heterophasic polypropylene composition and dispersed in above mentioned matrix, may be present in the range of 5 to 22 wt.-%, preferably in the range of 7 to 20 wt.-%, more preferably in the range of 8 to 19 wt.-%, based on the total weight of the heterophasic polypropylene composition.

The comonomer content, C2 (total), of the inventive polymer may be in the range of 1.5 to 6.5 wt.-%, preferably in the range of 1.7 to 6.0 wt.-%, more preferably in the range of 1.8 to 5.5 wt.-%.

Unimodal Matrix

The crystalline matrix being a propylene homo- or copolymer is being produced in a bulk step, then transferred to the second stage in which the amorphous propylene ethylene elastomer is produced in a first gas phase reactor (GPR1) in the presence of the first polypropylene fraction.

The comonomer content of the crystalline matrix may be in the range of 0.0 to 1.0 wt.-%, preferably in the range of 0.2 to 0.8 wt.-%, more preferably in the range of 0.4 to 0.6 wt.-%.

It is particularly preferable that the crystalline matrix (a) is a propylene homopolymer and comprises 0.0 wt.-% of comonomer.

The MFR of the crystalline matrix may be in the range of 80 to 200 g/10 min, preferably in the range of 90 to 180 g/10 min, more preferably in the range of 95 to 170 g/10 min. This applies regardless of the (bi)-modality of the crystalline matrix.

Bimodal Matrix:

In case, the crystalline matrix is bimodal, then the first polypropylene fraction is being produced in a bulk step, then transferred to the second stage in which the second polypropylene fraction is prepared in a first gas phase reactor (GPR1) in the presence of the first polypropylene fraction. This mixture, being the crystalline matrix and comprising said first and second polypropylene fractions together, is transferred to the third stage in which the amorphous propylene-ethylene elastomer is prepared in a gas phase reactor (GPR2) in the presence of the crystalline matrix.

The MFR2 of the polymer produced in the first stage, being the first polypropylene fraction, may be in the range of 20 to 100 g/10 min, preferably in the range of 25 to 98 g/10 min, more preferably in the range of 30 to 95 g/10 min.

The $MFR_2$ of the polymer produced in the second stage, being the second polypropylene fraction, may be in the range of 100 to 1000 g/10 min, preferably in the range of 105 to 950 g/10 min, more preferably in the range of 110 to 900 g/10 min.

Given the second polypropylene fraction is produced in the presence of the first polypropylene fraction, it is understood, that it's properties cannot be analysed as such, but have to be determined based on the properties of the first polypropylene fraction and the properties of the crystalline fraction.

In a preferred embodiment, the heterophasic polypropylene composition comprises
- a1) 45-65 wt.-%, preferably in the range of 47 to 60 wt.-%, more preferably in the range of 48 to 58 wt.-% of a first polypropylene fraction having an $MFR_2$ of 20-100 g/10 min,
- a2) 28-40 wt.-%, preferably in the range of 30 to 37 wt.-%, more preferably in the range of 31 to 37 wt.-% of a second polypropylene fraction having an $MFR_2$ of 100-1000 g/10 min,
- b) 5 to 22 wt.-% of the amorphous propylene ethylene elastomer, preferably in the range of 7 to 20 wt.-%, more preferably in the range of 8 to 19 wt.-%.

Preferably, the amount of the first polypropylene fraction is equal or higher than the amount of the second polypropylene fraction based on the total weight of the crystalline matrix.

The amount of the first polypropylene fraction may be in the range of 50-75 wt.-%, preferably 52-72 wt.-%, more preferably in the range of 55-70 wt.-% based on the total weight of the crystalline matrix.

The amount of the second polypropylene fraction may be in the range of 25-50 wt.-%, preferably 28-48 wt.-%, more preferably in the range of 30-45 wt.-% based on the total weight of the crystalline matrix.

The ratio of the amount of the first and the second polypropylene fraction may be in the ranges of 50:50 to 80:20, like 55:45 to 70:30, preferably 60:40 to 65:35.

For bulk and gas phase copolymerisation reactions, the reaction temperature used will generally be in the range 60 to 115° C. (e.g. 70 to 110° C.), the reactor pressure will generally be in the range 10 to 40 bar for gas phase reactions with bulk polymerisation operating at slightly higher pressures. The residence time will generally be 0.25 to 8 hours (e.g. 0.3 to 3 hours).

The comonomer content of the first and second polypropylene fraction may be same or different and independently chosen from each other.

The comonomer content of the polymer produced in the first stage, namely the first polypropylene fraction, may be in the range of 0.0 to 1.0 wt.-%, preferably in the range of 0.2 to 0.8 wt.-%, more preferably in the range of 0.4 to 0.6 wt.-%.

It is particularly preferable that the first polypropylene fraction is a propylene homopolymer and comprises 0.0 wt.-% of comonomer.

The comonomer content of the polymer produced in the second stage, namely the second polypropylene fraction, may be in the range of 0.0 to 1.0 wt.-%, preferably in the range of 0.2 to 0.8 wt.-%, more preferably in the range of 0.4 to 0.6 wt.-%.

It is particularly preferable that the second polypropylene fraction is a propylene homopolymer and comprises 0.0 wt.-% of comonomer.

Within this application it is understood, that the comonomer content of the crystalline matrix, when available as distinct material sample, is determined via NMR analysis. When the comonomer content of the matrix and the dispersed fraction should be evaluated starting from the final polymer (comprising both the matrix and the dispersed fraction), then the matrix (and its properties) is reflected by the crystalline fraction (CF) determined according to CRYSTEX QC analysis. Accordingly, the dispersed amorphous propylene ethylene elastomer is reflected by the soluble fraction (SF) determined according to CRYSTEX QC analysis.

Catalyst System

The heterophasic polypropylene composition according to the invention is preferably obtainable by a catalyst system comprising by a single-site catalyst, more preferably being obtainable by a metallocene catalyst complex and cocatalysts.

Preferred complexes of the metallocene catalyst include:

rac-dimethylsilanediylbis[2-methyl-4-(3',5'-dimethylphenyl)-5-methoxy-6-tert-butylinden-1-yl] zirconium dichloride, rac-anti-dimethylsilanediyl[2-methyl-4-(4'-tert-butylphenyl)-inden-1-yl][2-methyl-4-(4'-tertbutylphenyl)-5-methoxy-6-tert-butylinden-1-yl] zirconium dichloride, rac-anti-dimethylsilanediyl[2-methyl-4-(4'-tert-butylphenyl)-inden-1-yl][2-methyl-4-phenyl-5-methoxy-6-tert-butylinden-1-yl] zirconium dichloride, rac-anti-dimethylsilanediyl[2-methyl-4-(3',5'-tert-butylphenyl)-1,5,6,7-tetrahydro-sindacen-1-yl][2-methyl-4-(3',5'-dimethyl-phenyl)-5-methoxy-6-tert-butylinden-1-yl] zirconium dichloride, rac-anti-dimethylsilanediyl[2-methyl-4,8-bis-(4'-tert-butylphenyl)-1,5,6,7-tetrahydro-sindacen-1-yl][2-methyl-4-(3',5'-dimethyl-phenyl)-5-methoxy-6-tert-butylinden-1-yl]zirconium dichloride, rac-anti-dimethylsilanediyl[2-methyl-4,8-bis-(3',5'-dimethylphenyl)-1,5,6,7-tetrahydro-s-indacen-1-yl] [2-methyl-4-(3',5'-dimethylphenyl)-5-methoxy-6-tert-butylinden-1-yl]zirconium dichloride, rac-anti-dimethylsilanediyl[2-methyl-4,8-bis-(3',5'-dimethylphenyl)-1,5,6,7-tetrahydro-s-indacen-1-yl][2-methyl-4-(3',5'-5 ditert-butyl-phenyl)-5-methoxy-6-tert-butylinden-1-yl]zirconium dichloride.

Especially preferred is rac-anti-dimethylsilanediyl[2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert10butylinden-1-yl] zirconium dichloride.

Cocatalyst

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (I):

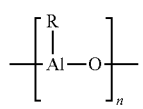

where n is from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10-alkyl, preferably C1-C5-alkyl, or C3-C10-cycloalkyl, C7-C12-arylalkyl or -alkylaryl and/or phenyl or naphthyl, and where Y can be hydrogen, halogen, preferably chlorine or bromine, or C1-C10-alkoxy, preferably methoxy or ethoxy. The resulting oxygen-containing aluminoxanes are not in general pure compounds but mixtures of oligomers of the formula (I).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

Also a boron containing cocatalyst is used in combination with the aluminoxane cocatalyst.

The catalyst complex ideally comprises a co-catalyst, certain boron containing cocatalysts are preferred. Especially preferred borates of use in the invention therefore comprise the trityl, i.e. triphenylcarbenium, ion. Thus the use of $Ph_3CB(PhF_5)_4$ and analogues therefore are especially favoured.

The catalyst system of the invention is used in supported form. The particulate support material used is silica or a mixed oxide such as silica-alumina, in particular silica. The use of a silica support is preferred. The skilled practitioner is aware of the procedures required to support a metallocene catalyst.

In a preferred embodiment, the catalyst system corresponds to the ICS3 of EP19177308.4.

Blend (A)

The polypropylene composition according to the present invention comprises 5.0 to 50.0 wt.-% of blend (A), based on the total weight of the polypropylene composition. It is the essence of the present invention that blend (A) is obtained from a recycled waste stream. Blend (A) can be either recycled post-consumer waste, post-industrial waste, such as for example from that the automobile industry, or alternatively, a combination of both.

The polypropylene composition (C) preferably contains from 10.0 to 40.0 wt.-%, most preferably from 13.0 to 35 wt.-% of blend (A).

Blend (A) is a polypropylene rich recycled material, meaning that it comprises significantly more polypropylene than polyethylene. Recycled waste streams, which are high in polypropylene can be obtained for example from the automobile industry, particularly as some automobile parts such as bumpers are sources of fairly pure polypropylene material in a recycling stream.

Preferably, the polypropylene rich recycled material is obtained from recycled waste by means of plastic recycling processes known in the art. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polypropylene rich recycled materials include: Purpolen®PP (Mtm Plastics GmbH), Axpoly® recycled polypropylene pellets (Axion Ltd) and PolyPropylene Copolymer (BSP Compounds). It is considered that the present invention could be applicable to a broad range of recycled polypropylene materials or materials or compositions having a high content of recycled polypropylene. The polypropylene-rich recycled material may be in the form of granules. In a certain preferred embodiment, Purpolen®PP (Mtm Plastics GmbH) is used as blend (A).

Blend (A) may have a relative amount of polypropylene of greater than 50 wt.-%, preferably greater than 53 wt.-%, more preferably greater than 60 wt.-%, more preferably greater than 70 wt.-%, more preferably greater than 75 wt.-%, more preferably greater than 80 wt.-%, most preferably greater than 85 wt.-%, with respect to the total weight of the composition.

In addition, blend (A) may have a relative amount of polyethylene of less than 47 wt.-%, more preferably less than 40 wt.-%, more preferably less than 30 wt.-%, more preferably less than 20 wt.-%, most preferably less than 15 wt.-%. Usually, the relative amount of polyethylene is more than 3 wt.-%, like more than 5 wt.-%, with respect to the total weight of the composition.

The weight ratio of polypropylene (A-1) and polyethylene (A-2) in blend (A) is from 9:1 to 13:7, more preferably from 9:1 to 3:1, most preferably from 9:1 to 4:1.

The recycled material can comprise recycled high-density polyethylene (rHDPE), recycled medium density polyethylene (rMDPE), recycled low-density polyethylene (rLDPE) and mixtures thereof.

According to the present invention, blend (A) has a content of limonene as determined using solid phase microextraction (HS-SPME-GC-MS) of from 1 ppm to 100 ppm, preferably from 1 ppm to 50 ppm, more preferably from 2 ppm to 50 ppm, most preferably from 2.5 ppm to 35 ppm. Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams.

The fatty acid content is yet another indication of the recycling origin of blend (A).

However, in some cases, the fatty acid content may be below the detection limit due to specific treatments in the recycling process.

According to the present invention, blend (A) preferably has a content of fatty acids as determined using solid phase microextraction (HS-SPME-GC-MS) of from 1 ppm to 200 ppm, preferably from 1 ppm to 150 ppm, more preferably from 2 ppm to 100 ppm, most preferably from 3 ppm to 80 ppm.

Preferably, blend (A) of the polypropylene-polyethylene composition of the present invention contains:
(i) less than 1.5 wt.-% polystyrene; and/or
(ii) less than 3.5 wt.-% talc; and/or
(iii) less than 1.0 wt.-% polyamide According to the present invention, blend (A) has a melt flow rate (ISO 1133, 2.16 kg, 230° C.) of 0.5 to 50.0 g/10 min, preferably of 5.0 to 40.0 g/10 min, more preferably of 10.0 to 30.0 g/10 min, most preferably of 18.0 to 25.0 g/10 min.

It is needless to say, during recycling usually any reasonable measure will be taken for any components other than polyethylene and polypropylene as far as final application or use suggests such measure.

Polypropylene Composition (C)

The polypropylene composition of the invention is obtainable by blending:
- a) 50.0 to 95.0 wt.-%, based on the total weight of the composition, of a heterophasic propylene copolymer (HECO), comprising
  - i) a crystalline matrix (M) being a propylene homo- or copolymer, preferably a homopolymer;
  - ii) an amorphous propylene-ethylene elastomer (E);
  - wherein the heterophasic propylene copolymer (HECO) has a crystalline fraction (CF) content determined according to CRYSTEX QC analysis in the range from 78.0 to 92.0 wt.-%, and a soluble fraction (SF) content determined according to CRYSTEX QC analysis in the range from 8.0 to 22.0 wt.-%, said soluble fraction (SF) having an ethylene content (C2(SF)), as determined by quantitative FT-IR spectroscopy calibrated by $^{13}$C-NMR spectroscopy, in the range from 15.0 to 30.0 wt.-% and an intrinsic viscosity (iV(SF)) in the range from 1.80 to 3.50 dl/g;
- c) 5.0 to 50.0 wt.-%, based on the total weight of the composition, of a blend (A) comprising
  - A-1) polypropylene
  - A-2) polyethylene
  - wherein the weight ratio of polypropylene (A-1) and polyethylene (A-2) is from 9:1 to 13:7, and
  - wherein blend (A) is a recycled material, which is recovered from a waste plastic material derived from post-consumer and/or post-industrial waste.

The polypropylene composition (C) of the present invention can comprise further components, in addition to the essential components as defined above. However, the individual contents of the heterophasic propylene copolymer (HECO) and blend (A) must add up to at least 90 wt.-%, preferably to at least 95 wt.-%, most preferably at least 97 wt.-% based on the total weight of the polypropylene composition (C).

Typical further components could be, for example, additives, the selection of which would be well-known to the skilled practitioner, and masterbatch polypropylenes, used to introduce the additives to the polypropylene composition (C).

Typically additives would be selected from antioxidants, anti-slip agents, nucleating agents, anti-scratch agents, anti-scorch agents, metal deactivators, UV-stabilisers, acid scavengers, lubricants, anti-static agents, pigments and the like, as well as combinations thereof. These additives are well known in the polymer industry and their use will be familiar to the skilled practitioner. Any additives which are present may be added as an isolated raw material or in a mixture with a carrier polymer, i.e. in a so-called master batch.

The content of heterophasic propylene copolymer (HECO) within the polypropylene composition (C) is from 50.0 to 95.0 wt.-%, more preferably from 51.0 to 90.0 wt.-%, most preferably from 52.0 to 85.0 wt.-%.

The content of blend (A) within the polypropylene composition (C) is from 5.0 to 50.0 wt.-%, more preferably from 10.0 to 49.0 wt.-%, most preferably from 15.0 to 48.0 wt.-%.

It is therefore preferred that the polypropylene composition (C) comprises:
- a) from 51.0 to 90.0 wt.-% of the heterophasic propylene copolymer (HECO), and
- b) from 10.0 to 49.0 wt.-% of blend (A).

It is further preferred that the polypropylene composition (C) comprises:
- a) from 52.0 to 85.0 wt.-% of the heterophasic propylene copolymer (HECO), and
- b) from 15.0 to 48.0 wt.-% of blend (A).

Preparing and further processing the polypropylene composition (C) includes mixing the individual components of the polypropylene composition (C), for instance by use of a conventional compounding or blending apparatus, e.g. a Banbury mixer, a 2-roll rubber mill, Buss-co-kneader or a twin screw extruder. A typical extruding temperature is in the range of 170 to 270° C., or more preferably in the range of 180 to 240° C.

The polypropylene composition (C) has a melt flow rate (MFR$_2$) measured according to ISO 1133 at 230° C. and 2.16 kg in the range from 20.0 to 70.0 g/10 min, more preferably in the range from 25.0 to 65.0 g/10 min, most preferably in the range from 30.0 to 60.0 g/10 min.

The propylene composition (C) preferably has a Charpy Notched Impact Strength (NIS) measured according to ISO 179-1eA at 23° C. in the range from 5.0 to 20.0 kJ/m$^2$, preferably in the range from 5.3 to 15.0 kJ/m$^2$, more preferably in the range from 5.5 to 12.0 kJ/m$^2$.

The propylene composition (C) preferably has a Charpy Notched Impact Strength (NIS) measured according to ISO 179-1eA at −20° C. in the range from 2.0 to 10.0 kJ/m$^2$ preferably in the range from 2.0 to 7.0 kJ/m$^2$, more preferably in the range from 2.5 to 5.0 kJ/m$^2$.

The propylene composition (C) preferably has a tensile modulus measured according to ISO 527-2 in the range from 900 to 1800 MPa, preferably in the range from 1000 to 1600 MPa, more preferably in the range from 1100 to 1400 MPa.

The propylene composition (C) preferably has a melting temperature (T$_m$) measured by differential scanning calorimetry (DSC) in the range from 155 to 170° C., more preferably in the range from 156 to 167° C., most preferably in the range from 156 to 165° C.

The propylene composition (C) preferably has a crystallization temperature (T$_c$) measured by differential scanning calorimetry (DSC) in the range from 115 to 130° C., more preferably in the range from 116 to 127° C., most preferably in the range from 116 to 125° C.

The propylene composition (C) preferably has numerical values of the Charpy Notched Impact Strength (NIS), measured according to ISO 179-1eA at 23° C. given in kJ/m$^2$, and the melt flow rate (MFR$_2$), measured according to ISO 1133 at 230° C. and 2.16 kg given in g/10 min, which follow the following inequation (I), more preferably inequation (Ia), most preferably inequation (Ib):

$$NIS \times MFR_2 \geq 150 \tag{I}$$

$$NIS \times MFR_2 \geq 180 \tag{Ia}$$

$$NIS \times MFR_2 \geq 210 \tag{Ib}$$

The propylene composition (C) according to the present invention preferably has a content of volatile organic compounds (VOC) determined according to VDA 278 October 2011 of below 100 μg/g, more preferably of below 80 μg/g, most preferably of below 60 μg/g.

The propylene composition (C) according to the present invention preferably has a content of semi-volatile organic compounds (FOG) determined according to VDA 278 October 2011 of below 450 μg/g, more preferably of below 350 μg/g, most preferably of below 270 μg/g.

Articles and Use

The polypropylene composition of the present invention has a desirable balance of stiffness (as given by the tensile modulus) and impact strength (Charpy). This balance makes the copolymer a good candidate for automotive components.

The present invention is therefore further directed to an article comprising the polypropylene composition as described above.

Said article comprises more than 75 wt.-%, preferably more than 85 wt.-%, more preferably more than 90 wt.-%, still more preferably more than 95 wt.-% of the polypropylene composition of the present invention. In a separate embodiment, the article consists of just said polypropylene composition.

If present, other components may be, for example, further polymeric components, fillers, fibers, and other suitable components well known to the skilled practitioner.

The article may be a molded article, preferably an injection molded article or a foam injection molded article.

The article may further be a part of household appliances, especially of washing machine or dishwasher components, or automotive articles, especially of car interiors and exteriors, like instrumental carriers, shrouds, structural carriers, bumpers, side trims, step assists, body panels, spoilers, dashboards, interior trims and the like.

All embodiments and restrictions of the composition as discussed above may equally be applied to the composition in said article.

The present invention is further directed to the use of a modifier being a blend (A), which comprises:
A-1) polypropylene
A-2) polyethylene
wherein the weight ratio of polypropylene (A-1) and polyethylene (A-2) is from 9:1 to 13:7, and
wherein blend (A) is a recycled material, which is recovered from a waste plastic material derived from post-consumer and/or post-industrial waste,
for modifying a heterophasic propylene copolymer (HECO) comprising:
  i) a crystalline matrix (M) being a propylene homo- or copolymer, preferably a homopolymer;
  ii) an amorphous propylene-ethylene elastomer (E);
wherein the heterophasic propylene copolymer (HECO) has a crystalline fraction (CF) content determined according to CRYSTEX QC analysis in the range from 78.0 to 92.0 wt.-%, and a soluble fraction (SF) content determined according to CRYSTEX QC analysis in the range from 8.0 to 22.0 wt.-%, said soluble fraction (SF) having an ethylene content (C2(SF)) in the range from 15.0 to 30.0 wt.-% and an intrinsic viscosity (iV(SF)) in the range from 1.80 to 3.50 dl/g;
thereby obtaining an upgraded polypropylene composition, comprising at least a combined 90 wt.-% of the modifier and heterophasic propylene copolymer (HECO), having: an improvement in the Charpy Notched Impact Strength (NIS), measured according to ISO 179-leA at 23° C., of at least 15% relative to the raw heterophasic propylene copolymer (HECO), and
an improvement in the tensile modulus, measured according to ISO 527-2, of at least 8% relative to the raw heterophasic propylene copolymer (HECO).

The improvement in the Charpy Notched Impact Strength (NIS), measured according to ISO 179-leA at 23° C., is at least 15% relative to the raw heterophasic propylene copolymer (HECO), preferably at least 17%, more preferably at least 19%.

The improvement in the tensile modulus, measured according to ISO 527-2, is at least 8% relative to the raw heterophasic propylene copolymer (HECO), preferably at least 9%, more preferably at least 10%.

All embodiments and restrictions of the individual components or the composition as discussed above may equally be applied in said use.

EXAMPLES

1. Definitions/Determination Methods

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization (He) are determined from the cooling step, while melting temperature ($T_m$) and melt enthalpy ($H_m$) are determined from the second heating step.

Quantification of PP Matrix Microstructure by NMR Spectroscopy

Quantitative nuclear-magnetic resonance (NMR) spectroscopy was used to quantify the stereo-regularity (tacticity) and regio-regularity of the crystalline matrix of the polymers. Quantitative 13C {1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probe head at 125° C. using nitrogen gas for all pneumatics.

For propylene homopolymers approximately 200 mg of material was dissolved in 1,2-tetrachloroethane-d2 (TCE-d2). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs. For propylene homopolymers all chemical shifts are internally referenced to the methyl isotactic pentad (mmmm) at 21.85 ppm. The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences. The isotacticity was determined at the pentad level and reported as the percentage of isotactic pentad (mmmm) sequences with respect to all pentad sequences:

$$[mmmm]\% = 100*(mmmm/\text{sum of all pentads}).$$

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253). The amount of 2.1 erythro regio defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2.1 erythro regio defects was quantified with respect to all propene:

$$[21e] \text{ mol }\% = 100*(P_{21e}/P_{total})$$

Determination of the C2- and C3-Content in PP Copolymers

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents. For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E[\text{mol-}\%] = 100*fE$$

The weight percent comonomer incorporation was calculated from the mole fraction:

$$E[\text{wt.-}\%] = 100*(fE*28.06)/((fE*28.06) + ((1-fE)*42.08))$$

Xylene Cold Soluble (XCS)

Xylene Cold Soluble fraction at room temperature (XCS, wt.-%) is determined at 25° C. according to ISO 16152; 5$^{th}$ edition; 2005-07-01.

Tensile Modulus

The tensile modulus was measured according to ISO 527-2 (cross head speed=1 mm/min; test speed 50 mm/min at 23° C.) using compression moulded specimens as described in EN ISO 1873-2 (dog bone shape, 4 mm thickness). The measurement was done after 96 h conditioning time of the specimen.

Notched Impact Strength (NIS)

The Charpy notched impact strength (NIS) was measured according to ISO 179 leA at +23° C. or −20° C., using injection moulded bar test specimens of 80×10×4 mm$^3$ prepared in accordance with EN ISO 1873-2.

Crystex Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

A schematic representation of the CRYSTEX QC instrument is shown in FIG. 1a. The crystalline and amorphous fractions are separated through temperature cycles of dissolution at 160° C., crystallization at 40° C. and re-dissolution in a 1,2,4-trichlorobenzene (1,2,4-TCB) at 160° C. as shown in FIG. 1b. Quantification of SF and CF and determination of ethylene content (C2) of the parent EP copolymer and its soluble and crystalline fractions are achieved by means of an infrared detector (IR4) and an online 2-capillary viscometer which is used for the determination of the intrinsic viscosity (iV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by $^{13}C$-NMR spectroscopy) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt.-%.

The intrinsic viscosity (iV) of the parent EP copolymer and its soluble and crystalline fractions are determined with a use of an online 2-capillary viscometer and are correlated to corresponding iV's determined by standard method in decalin according to ISO 1628. Calibration is achieved with various EP PP copolymers with iV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 1a and 1b, a defined volume of the sample solution is injected into the column filled with inert support where the crystallization of the sample and separation of the soluble fraction from the crystalline part is taking place. This process is repeated two times. During the first injection the whole sample is measured at high temperature, determining the iV[dl/g] and the C2[wt.-%] of the PP composition. During the second injection the soluble fraction (at low temperature) and the crystalline fraction (at high temperature) with the crystallization cycle are measured (wt.-% SF, wt.-% C2, iV).

EP means ethylene propylene copolymer.
PP means polypropylene.

Intrinsic Viscosity

The intrinsic viscosity (iV) is measured according to DIN ISO 1628/1, October 1999, in Decalin at 135° C.

VOC Value

The VOC value is determined according to VDA 278 October 2011 from injection moulded plaques. VDA 278 October 2011, Thermal Desorption Analysis of Organic Emissions for the Characterization of Non-Metallic Materials for Automobiles, VDA Verband der Automobilindustrie. According to the VDA 278 October 2011 the VOC value is defined as "the total of the readily volatile to medium volatile substances. It is calculated as toluene equivalent. The method described in this Recommendation allows substances in the boiling/elution range up to n-Pentacosane (C25) to be determined and analyzed."

Fog Value:

The FOG value is determined according to VDA 278 October 2011 from injection moulded plaques. According to the VDA 278 October 2011 the FOG value is defined as "the total of substances with low volatility which elute from the retention time of n-Tetradecane (inclusive). It is calculated as hexadecane equivalent. Substances having a boiling point in the boiling range of n-Alkanes "C16" to "C32" are determined and analyzed".

Amount of iPP, Polystyrene, Polyethylene (and Ethylene Containing Copolymers), Poly(Ethylene Terephthalate), and Amount of Polyamide-6

Calibration standards are prepared by blending iPP and HDPE to create a calibration curve. The thickness of the films of the calibration standards are 300 m. For the quantification of the iPP, PS and PA 6 content in the samples quantitative IR spectra are recorded in the solid-state using a Bruker Vertex 70 FTIR spectrometer. Spectra are recorded on 25×25 mm square films of 50-100 m thickness prepared by compression moulding at 190° C. and 4-6 mPa. Standard transmission FTIR spectroscopy is employed using a spectral range of 4000-400 $cm^{-1}$, an aperture of 6 mm, a spectral resolution of 2 $cm^{-1}$, 16 background scans, 16 spectrum scans, an interferogram zero filling factor of 32 and Norton Beer strong apodisation.

The absorption of the band at 1167 $cm^{-1}$ in iPP is measured and the iPP content is quantified according to a calibration curve (absorption/thickness in cm versus iPP content in weight %). The absorption of the band at 1601 cm−1 (PS), at 1513 cm−1 (PET) and 3300 $cm^{-1}$ (PA6) are measured and the PS, PET and PA6 content quantified according to the calibration curve (absorption/thickness in cm versus PS, PET and PA content in wt %). The content of polyethylene and ethylene containing copolymers is obtained by subtracting (iPP+PS+PET+PA6) from 100, taking into account the content of non-polymeric impurities as determined in the methods below. The analysis is performed as double determination.

Amount of Talc and Chalk

The talc and chalk contents were measured by Thermogravimetric Analysis (TGA); experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to CO2 evolving from CaCO3, and therefore the chalk content was evaluated as:

$$\text{Chalk content}=100/44\times WCO2$$

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

$$\text{Ash content}=(\text{Ash residue})-56/44\times WCO2-Wcb$$

Where Ash residue is the weight % measured at 900° C. in the first step conducted under nitrogen. The ash content is estimated to be the same as the talc content for the investigated recyclates.

Amount of Paper and Wood

The contents of paper and wood were determined by conventional laboratory methods including milling, floatation, microscopy and Thermogravimetric Analysis (TGA).

Amount of Metals

The metal content was determined by X-ray fluorescence (XRF).

Amount of Limonene

The limonene content was determined by solid phase microextraction (HS-SPME-GC-MS). Additional details are given below with respect to the specific sample.

Amount of Total Fatty Acids

The fatty acid content was determined by solid phase microextraction (HS-SPME-GC-MS). Additional details are given below with respect to the specific sample.

2. Experimental

2.1 Polymerization of the HECO Component

2.1.1 Metallocene-Catalysed HECO1 and HECO2

Catalyst Synthesis

The catalyst used was Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl] zirconium dichloride as disclosed in EP19177308.4 as ICS3.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressurising and depressurising with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 600 under nitrogen flow for 2 hours and then for 5 hours under vacuum (−0.5 barg) with stirring. MAO treated support was collected as a free-flowing white powder found to contain 12.2% Al by weight.

Catalyst Preparation 30 wt.-% MAO in toluene (0.7 kg) was added into a steel nitrogen blanked reactor via a burette at 20° C. Toluene (5.4 kg) was then added under stirring. The catalyst as cited above (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9% Al and 0.110% Zr.

2.1.2 Ziegler-Natta-Catalysed HECO3 and HECO4

The Ziegler-Natta catalyst was an emulsion-type Ziegler-Natta catalyst, being identical to of the catalyst employed in the polymerisation of the inventive examples of WO 2016/06646 A1.

TABLE 1

Polymerisation conditions for inventive and comparative HECOs

| | | HECO1 | HECO2 | HECO3 | HECO4 |
|---|---|---|---|---|---|
| Prepolymerisation | | | | | |
| Co/ED | mol/mol | — | — | 10 | 20 |
| Co/Ti | mol/mol | — | — | 220 | 250 |
| Temperature | ° C. | 25 | 25 | 30 | 20 |
| Residence time | min | 20 | 20 | 20 | 20 |
| Loop | | | | | |
| Temperature | ° C. | 70 | 78 | 75 | 70 |
| Split | wt.-% | 49 | 53 | 52 | 40 |
| Feed H2/C3 | mol/kmol | 0.40 | 0.28 | 22 | 12 |
| MFR2 | g/10 min | 60 | 35 | 160 | 100 |
| First GPR | | | | | |
| Temperature | ° C. | 70 | 80 | 80 | 85 |
| Split | wt.-% | 33 | 36 | 34 | 45 |
| H2/C3 | mol/kmol | 3.7 | 5.5 | 175 | 83 |
| MFR2 | g/10 min | 102 | 128 | 160 | 80 |
| Second GPR | | | | | |
| Temperature | ° C. | 70 | 70 | 80 | 70 |
| C2/C3 | mol/kmol | 807 | 785 | 550 | 400 |
| H2/C2 | mol/kmol | 2 | 3 | 250 | 130 |
| Split | wt.-% | 18 | 11 | 14 | 15 |
| MFR2 | g/10 min | 43 | 82 | 95 | 40 |
| Pellet | | | | | |
| XCS | wt.-% | 17.5 | 11.8 | 15.0 | 16.5 |
| C2(XCS) | wt.-% | 18.5 | 20.8 | 39.0 | 33.7 |
| iV(XCS) | dl/g | 2.4 | 2.5 | 2.6 | 2.6 |
| Tm | ° C. | 154 | 154 | 165 | 165 |
| Tc | ° C. | 114 | 114 | 120 | 120 |
| SF | wt.-% | 18.1 | 11.1 | 14.2 | 15.7 |
| CF | wt.-% | 81.9 | 88.9 | 85.8 | 84.3 |
| C2(total) | wt.-% | 4.1 | 2.6 | 6.4 | 6.5 |
| C2(SF) | wt.-% | 17.6 | 19.4 | 37.9 | 32.6 |
| C2(CF) | wt.-% | 1.4 | 1.1 | 1.2 | 1.6 |
| iV(SF) | dl/g | 2.7 | 2.0 | 2.3 | 2.3 |

The crystalline matrices of synthesized HECO1 and HECO2 both have an isotactic pentad concentration [mmmm] as determined by $^{13}$C-NMR spectroscopy of 99.2% and a content of 2,1-regiodefects of 0.36 mol %.

The crystalline matrices of synthesized HECO3 and HECO4, i.e the polymers as sampled after the first GPR, both have an isotactic pentad concentration [mmmm] as determined by $^{13}$C-NMR spectroscopy of 97.4% and are free of 2,1-regiodefects.

2.2 Blend (A)

Purpolen PP has been used as blend (A), being a polypropylene-polyethylene blend from MTM Plastics GmbH, materials according to the August 2018 specifications:

| Purpolen PP sample: | |
|---|---|
| Polypropylene | 86.8 wt.-% |
| Polyethylene | 12.0 wt.-% |
| Polystyrene | <1.0 wt.-% |
| Polyamide-6 | <0.5 wt.-% |
| Poly(ethylene terephthalate) | trace |
| Talc content | <1.0 wt.-% |

-continued

| Purpolen PP sample: | |
|---|---|
| Chalk content | <1.0 wt.-% |
| Limonene content | 2.6 mg/kg |
| Total fatty acid content | 28.7 mg/kg |
| weight ratio PP/PE | 7.2/1 |

Limonene Content in Purpolen

Measurement

Limonene quantification was carried out using solid phase micro-extraction (HS-SPME-GC-MS) by standard addition.

50 mg ground samples were weighed into 20 mL headspace vials and after the addition of limonene in different concentrations and a glass-coated magnetic stir bar, the vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6, 11 and 16.5 mg/kg limonene were used in combination with some of the samples tested in this application. For quantification, ion-93 acquired in SIM mode was used. Enrichment of the volatile fraction was carried out by headspace solid phase micro-extraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:
  Column: 30 m HP 5 MS 0.25*0.25
  Injector: Splitless with 0.75 mm SPME Liner, 270° C.
  Temperature program: −10° C. (1 min)
  Carrier gas: Helium 5.0, 31 cm/s linear velocity, constant flow
  MS: Single quadrupole, direct interface, 280° C. inter face temperature
  Acquisition: SIM scan mode
  Scan parameter: 20-300 amu
  SIM Parameter: m/Z 93, 100 ms dwell time

TABLE 2

Limonene content in Purpolen PP

| Sample | Limonene [mg/kg] HS-SPME-GC-MS[1] |
|---|---|
| Purpolen PP | 2.6 ± 0.1 |

[1]Headspace Solidphase Microextraction. Materials available from mtm plastics GmbH according to August 2018 specifications.

Total Free Fatty Acid Content

Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass coated magnetic stir bar the vial was closed with a magnetic cap lined with silicone/PTFE. 10 µL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:
  Column: 20 m ZB Wax plus 0.25*0.25
  Injector: Split 5:1 with glass lined split liner, 250° C.
  Temperature program: 40° C. (1 min) @6° C./min to 120° C., @15° C. to 245° C. (5 min)
  Carrier: Helium 5.0, 40 cm/s linear velocity, constant flow
  MS: Single quadrupole, direct interface, 220° C. inter face temperature
  Acquisition: SIM scan mode
  Scan parameter: 46-250 amu 6.6 scans/s
  SIM Parameter: m/z 60, 74, 6.6 scans/s

TABLE 3

Total fatty acid content in Purpolen PP

| Sample | Total fatty acid concentration [mg/kg][1] |
|---|---|
| Purpolen PP | 28.7 |

[1]The concentration of acetic acid, propionic acid, butyric acid, pentanoic acid, hexanoic acid, octanoic acid, nonanoic acid and decanoic acid in each sample was added together to give a totally fatty acid concentration value.

2.3 Inventive and Comparative Examples

A number of compositions were compounded according to the recipes given in Table 4

TABLE 4

Recipes of inventive and comparative examples

| | | IE1 | IE2 | IE3 | IE4 | CE1 | CE2 | CE3 | CE4 | CE5 | CE6 |
|---|---|---|---|---|---|---|---|---|---|---|---|
| HECO1 | wt.-% | 68.5 | — | — | — | — | — | 100 | — | — | — |
| HECO2 | wt.-% | — | 83.8 | 68.8 | 53.8 | — | — | — | 100 | — | — |
| HECO3 | wt.-% | — | — | — | — | — | — | — | — | 68.8 | — |
| HECO4 | wt.-% | — | — | — | — | — | — | — | — | — | 100 |
| Purpolen PP | wt.-% | 30 | 15 | 30 | 45 | 100 | 83 | — | — | 30 | — |
| HC001 | wt.-% | 1.4 | 1.1 | 1.1 | 1.1 | — | 1.7 | — | — | 1.1 | — |
| SD233CF | wt.-% | — | — | — | — | — | 15 | — | — | — | — |
| Stabilizer | wt.-% | 0.1 | 0.1 | 0.1 | 0.1 | — | — | — | — | 0.1 | — |

TABLE 4-continued

Recipes of inventive and comparative examples

|  |  | IE1 | IE2 | IE3 | IE4 | CE1 | CE2 | CE3 | CE4 | CE5 | CE6 |
|---|---|---|---|---|---|---|---|---|---|---|---|
| BHT | wt.-% | — | — | — | — | — | 0.15 | — | — | — | — |
| AO | wt.-% | — | — | — | — | — | 0.15 | — | — | — | — |

HC001 A commercial unimodal propylene homopolymer HC001A-B1 of Borealis AG having an MFR$_2$ of about 2 g/10 min and a Tm of 160° C.
SD233CF A very soft random heterophasic copolymer having an MFR$_2$ of 7 g/10 min.
Stabilizer Irganox B 215, a 2:1 blend of Irgafos 168 (Tris (2,4-di-tbutylphenyl)phosphite, CAS-No. 31570-04-4) and Irganox 1010 (Pentaerythrityl-tetrakis(3-(3',5'-di-tert. butyl-4-hydroxyphenyl)-propionate, CAS-No. 6683-19-8), acting as process and long-term thermal stabilizer, commercially available from BASF SE
BHT Butylated hydroxytoluene, Ionol-CP, commercially available from Oxiris Chemicals S.A.
AO Hostanox P-EPQ-FF, a phosphorus based secondary antioxidant, commercially available from Clariant International Ltd.

TABLE 5

Properties of the inventive and comparative examples

|  |  | IE1 | IE2 | IE3 | IE4 | CE1 | CE2 | CE3 | CE4 | CE5 | CE6 |
|---|---|---|---|---|---|---|---|---|---|---|---|
| MFR$_2$ | g/10 min | 36 | 55 | 45 | 40 | 22 | 6.0 | 43 | 82 | 32 | 40 |
| Tm(PP) | ° C. | 164 | 157 | 159 | 160 | 164 | 161 | 154 | 154 | 165 | 165 |
| Tm(PE) | ° C. | 127 | 128 | 127 | 127 | 128 | — | — | — | 127 | — |
| Hm(PP) | J/g | 93 | 97 | 95 | 91 | 89 | 96 | 98 | 101 | 96 | 98 |
| Hm(PE) | J/g | 2 | 2 | 5 | 10 | 21 | — | — | — | 5 | — |
| Tc(PP) | ° C. | 124 | 124 | 124 | 125 | 125 | 120 | 114 | 114 | 120 | 124 |
| Tc(PE) | ° C. | 117 | 117 | 117 | 117 | 117 | — | — | — | 116 | — |
| Tens. Mod. | MPa | 1131 | 1326 | 1328 | 1313 | 1236 | 1122 | 1007 | 1184 | 1342 | 1208 |
| NIS +23° C. | kJ/m$^2$ | 9.7 | 5.7 | 6.0 | 5.8 | 5.9 | 6.4 | 8.1 | 4.5 | 3.2 | 6.7 |
| NIS −20° C. | kJ/m$^2$ | 3.4 | 2.0 | 2.0 | 2.0 | 3.1 | — | — | — | 1.8 | 3.3 |
| NIS × MFR$_2$ |  | 349 | 314 | 270 | 232 | 130 | 38 | 348 | 369 | 102 | 268 |
| VOC | μg/g | 28 | 33 | 40 | 59 | 415 | — | — | — | 408 | 365 |
| FOG | μg/g | 165 | 120 | 177 | 257 | 684 | — | — | — | 702 | 594 |

As can be seen from Table 5, the inventive examples have a superior balance of stiffness (tensile modulus) and impact strength (Charpy) in comparison to CE1 to CE4, which represent the individual components present in the inventive examples, as well as CE5, which represents a similar composition wherein the metallocene-catalysed HECO has been replaced with a Ziegler-Natta-catalysed HECO. In particular, it is notable that incorporation of a minor amount of recycled blend (A) results in the improvement of the properties relative to the virgin HECO component (see IE1 vs. CE3, and IE2, IE3 and IE4 vs. CE4). In each case, the Charpy NIS is notably increased, whilst the tensile modulus also markedly increased. The effect that a HECO can be improved by the addition of a recycled blend is a particularly noteworthy result, especially since the properties of the inventive blends are not simply a result of aggregating the properties. Most inventive blends have Charpy NIS values notably higher than either of the individual components. Furthermore, the inventive examples exhibit high notched impact strengths, even at relatively high melt flow rates, a difficult combination to achieve (see the NIS×MFR$_2$ values). Furthermore, the content of volatiles and semi-volatiles (VOC and FOG values) are noticeably lower, not just with respect to CE 1, but also to comparable compositions that contain Ziegler-Natta-catalysed HECOs (CE5 has a similar composition with 30 wt.-% of Purpolen PP, whilst CE6 has been chosen since it shows a very similar balance of mechanical properties to the inventive examples). Since the inventive compositions are partially sourced from recycling streams, they are more likely to comply with regulations regarding recycled content, which is particularly advantageous considering the evolution of regulations in the polymer field.

The invention claimed is:

1. A polypropylene composition (C) obtainable by blending:
    a) 50.0 to 95.0 wt.-%, based on the total weight of the composition, of a heterophasic propylene copolymer (HECO), comprising
    i) a crystalline matrix (M) being a propylene homo- or copolymer;
    ii) an amorphous propylene-ethylene elastomer (E);
    wherein the heterophasic propylene copolymer (HECO) has a crystalline fraction (CF) content determined according to the method given in the determination methods in the range from 78.0 to 92.0 wt.-%, and a soluble fraction (SF) content determined according to the method given in the determination methods in the range from 8.0 to 22.0 wt.-%, said soluble fraction (SF) having an ethylene content (C2(SF)), as determined by quantitative FT-IR spectroscopy calibrated by $^{13}$C-NMR spectroscopy, in the range from 15.0 to 30.0 wt.-% and an intrinsic viscosity (iV(SF)) in the range from 1.80 to 3.50 dl/g, wherein the heterophasic propylene copolymer (HECO) has a melting temperature (Tm) measured by differential scanning calorimetry (DSC) in the range from 150 to 159° C.;
    b) 5.0 to 50.0 wt.-%, based on the total weight of the composition, of a blend (A) comprising
    polypropylene (A-1)
    polyethylene (A-2)
    wherein the weight ratio of polypropylene (A-1) and polyethylene (A-2) is from 9:1 to 13:7, and
    wherein blend (A) is a recycled material, which is recovered from a waste plastic material derived from post-consumer and/or post-industrial waste;

wherein the polypropylene composition (C) has a melt flow rate (MFR$_2$) measured according to ISO 1133 at 230° C. and 2.16 kg in the range from 20.0 to 70.0 g/10 min, and the sum of the content of the heterophasic propylene copolymer (HECO) and the content of blend (A) is at least 90 wt.-%, based on the total weight of the composition.

2. The polypropylene composition (C) according to claim 1, wherein the heterophasic propylene copolymer (HECO) has a melt flow rate (MFR$_2$) measured according to ISO 1133 at 230° C. and 2.16 kg in the range from 30 to 120 g/10 min.

3. The polypropylene composition (C) according to claim 1, wherein the crystalline matrix of the heterophasic propylene copolymer (HECO) has a melt flow rate (MFR$_2$) measured according to ISO 1133 at 230° C. and 2.16 kg in the range from 80 to 180 g/10 min.

4. The polypropylene composition (C) according to claim 1, wherein the soluble fraction (SF) of the heterophasic propylene copolymer (HECO), determined according to the method given in the determination methods, has an intrinsic viscosity (iV (SF)) in the range from 2.00 to 3.20 dl/g.

5. The polypropylene composition (C) according to claim 1, wherein the blend (A) has a melt flow rate (MFR$_2$) measured according to ISO 1133 at 230° C. and 2.16 kg in the range from 0.5 to 50 g/10 min.

6. The polypropylene composition (C) according to claim 1, wherein the crystalline matrix (M) of the heterophasic propylene copolymer (HECO) has an isotactic pentad concentration [mmmm] as determined by $^{13}$C-NMR spectroscopy of more than 97.0% and a content of 2,1-regiodefects in the range from 0.1 to 0.6 mol %.

7. The polypropylene composition (C) according to claim 1, wherein the heterophasic propylene copolymer (HECO) has:
  a crystallization temperature (Tc) measured by differential scanning calorimetry (DSC) in the range from 105 to 120° C.

8. The polypropylene composition (C) according to claim 1, wherein the polypropylene composition (C) has:
  a) a melting temperature (Tm) measured by differential scanning calorimetry (DSC) in the range from 155 to 170° C., and/or
  b) a crystallization temperature (Tc) measured by differential scanning calorimetry (DSC) in the range from 115 to 130° C.

9. The polypropylene composition (C) according to claim 1, wherein the polypropylene composition (C) has a tensile modulus measured according to ISO 527-2 in the range from 900 to 1800 MPa.

10. The polypropylene composition (C) according to claim 1, wherein the polypropylene composition (C) has:
  a) a Charpy Notched Impact Strength (NIS) measured according to ISO 179-1eA at 23° C. in the range from 5.0 to 20 kJ/m$^2$, and/or
  b) a Charpy Notched Impact Strength (NIS) measured according to ISO 179-1eA at −20° C. in the range from 2.0 to 10.0 KJ/m$^2$.

11. The polypropylene composition (C) according to claim 1, wherein the numerical values of the Charpy Notched Impact Strength (NIS), measured according to ISO 179-1eA at 23° C. given in kJ/m$^2$, and the melt flow rate (MFR$_2$), measured according to ISO 1133 at 230° C. and 2.16 kg given in g/10 min, follow the following inequation:

$$NIS \times MFR_2 \geq 210 \qquad (Ib)$$

12. The polypropylene composition (C) according to claim 1, wherein the polypropylene composition (C) has:
  a) a content of volatile organic compounds (VOC) determined according to VDA 278 October 2011 of below 100 μg/g, and/or
  b) a content of semi-volatile organic compounds (FOG) determined according to VDA 278 October 2011 of below 450 μg/g.

13. An article comprising more than 75 wt.-% of the polypropylene composition according to claim 1.

14. The article according to claim 13, wherein the article is a part of household appliances, of washing machine or dishwasher components, or automotive articles, of car interiors and exteriors, instrumental carriers, shrouds, structural carriers, bumpers, side trims, step assists, body panels, spoilers, dashboards, or interior trims.

15. The polypropylene composition (C) according to claim 1, wherein the weight ratio of polypropylene (A-1) and polyethylene (A-2) in blend (A) is from 9:1 to 3:1.

* * * * *